April 28, 1925.
E. G. LATTA
TYPEWRITING MACHINE
Filed July 7, 1921    6 Sheets-Sheet 1
1,535,322
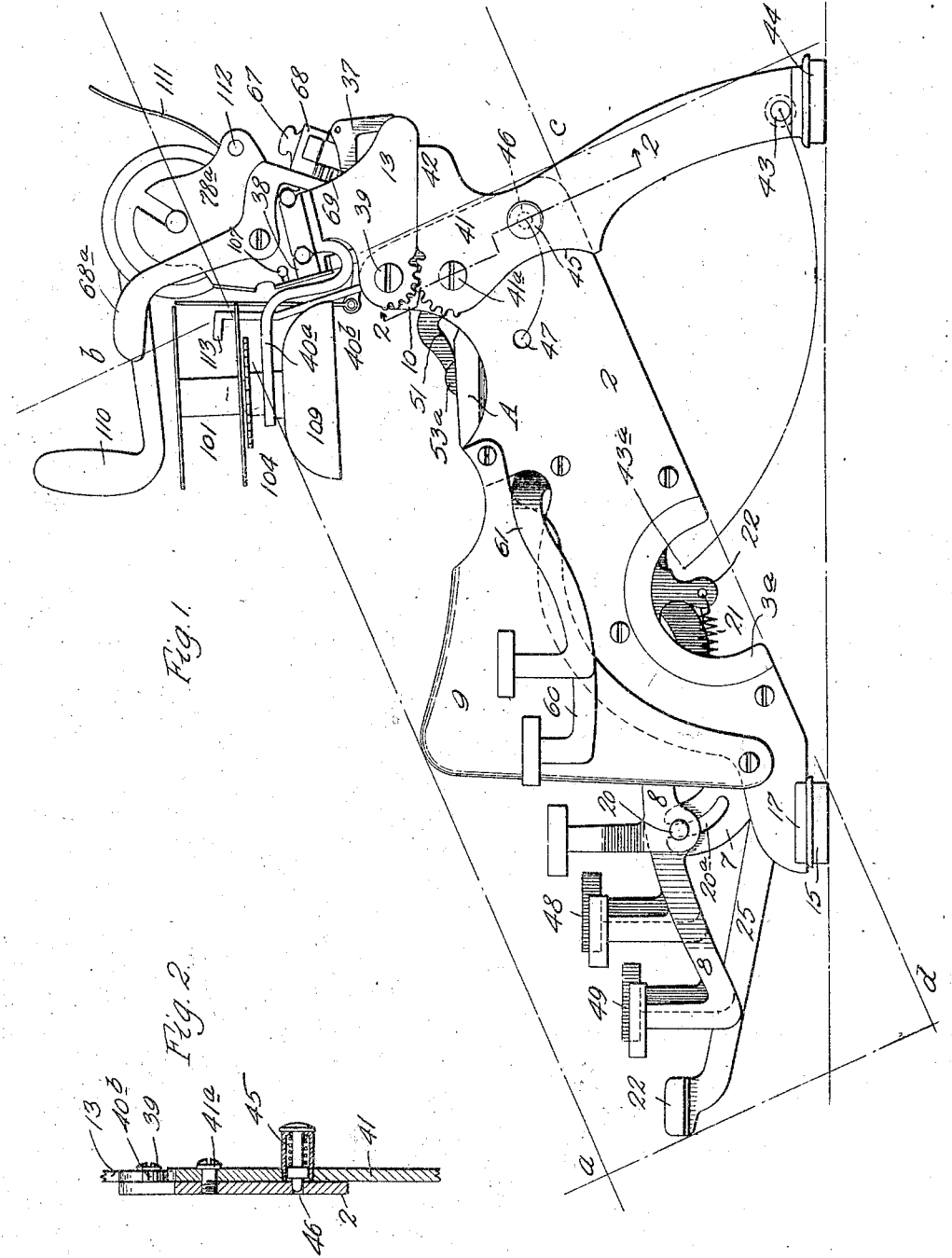
INVENTOR.
Emmit G. Latta,
by Parker & Rockwood.
ATTORNEYS.

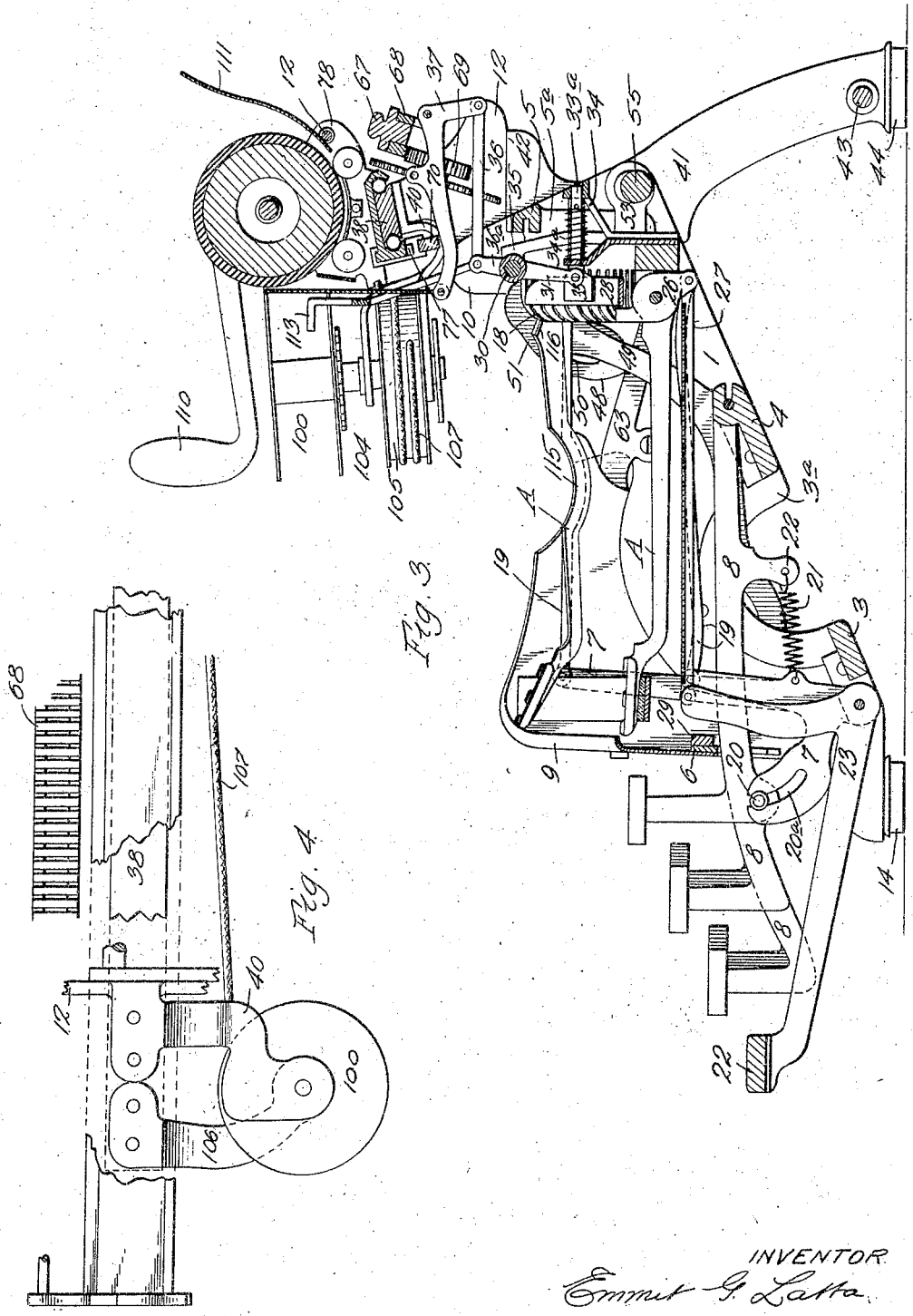

April 28, 1925.
E. G. LATTA
1,535,322
TYPEWRITING MACHINE
Filed July 7, 1921
6 Sheets-Sheet 4
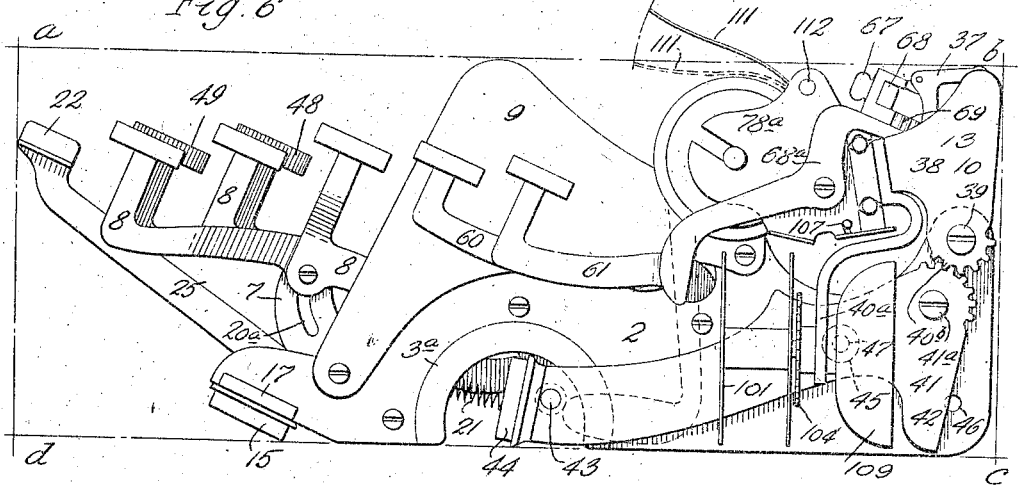
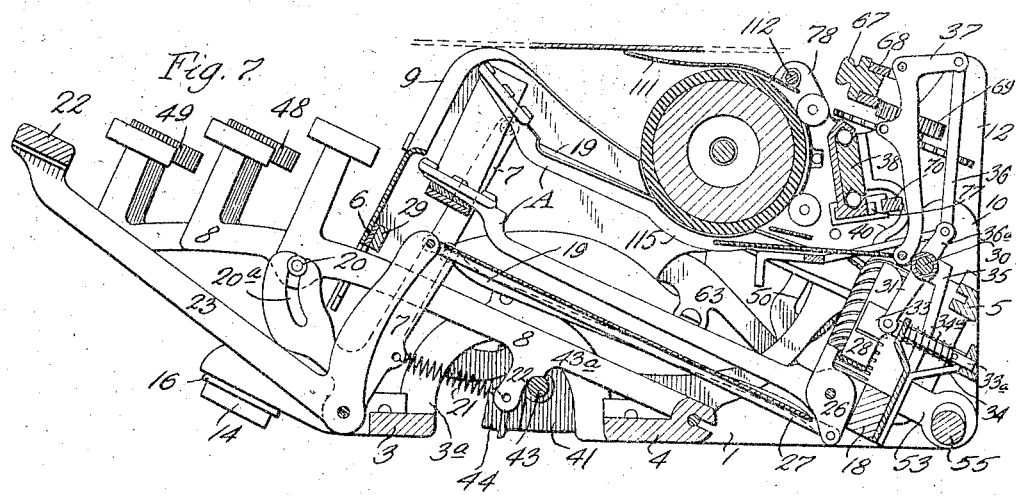
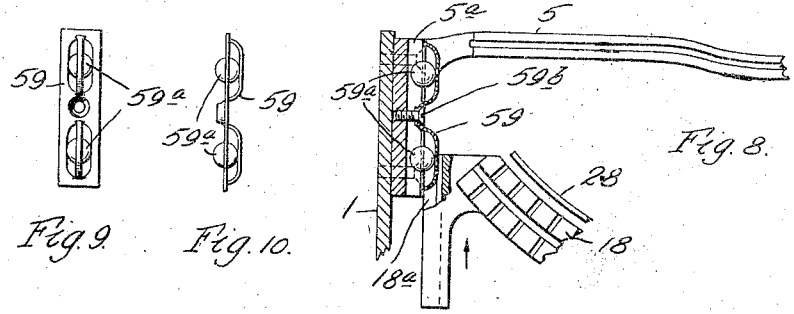
INVENTOR.
Emmit G. Latta.
by Parker & Brockway,
ATTORNEYS.

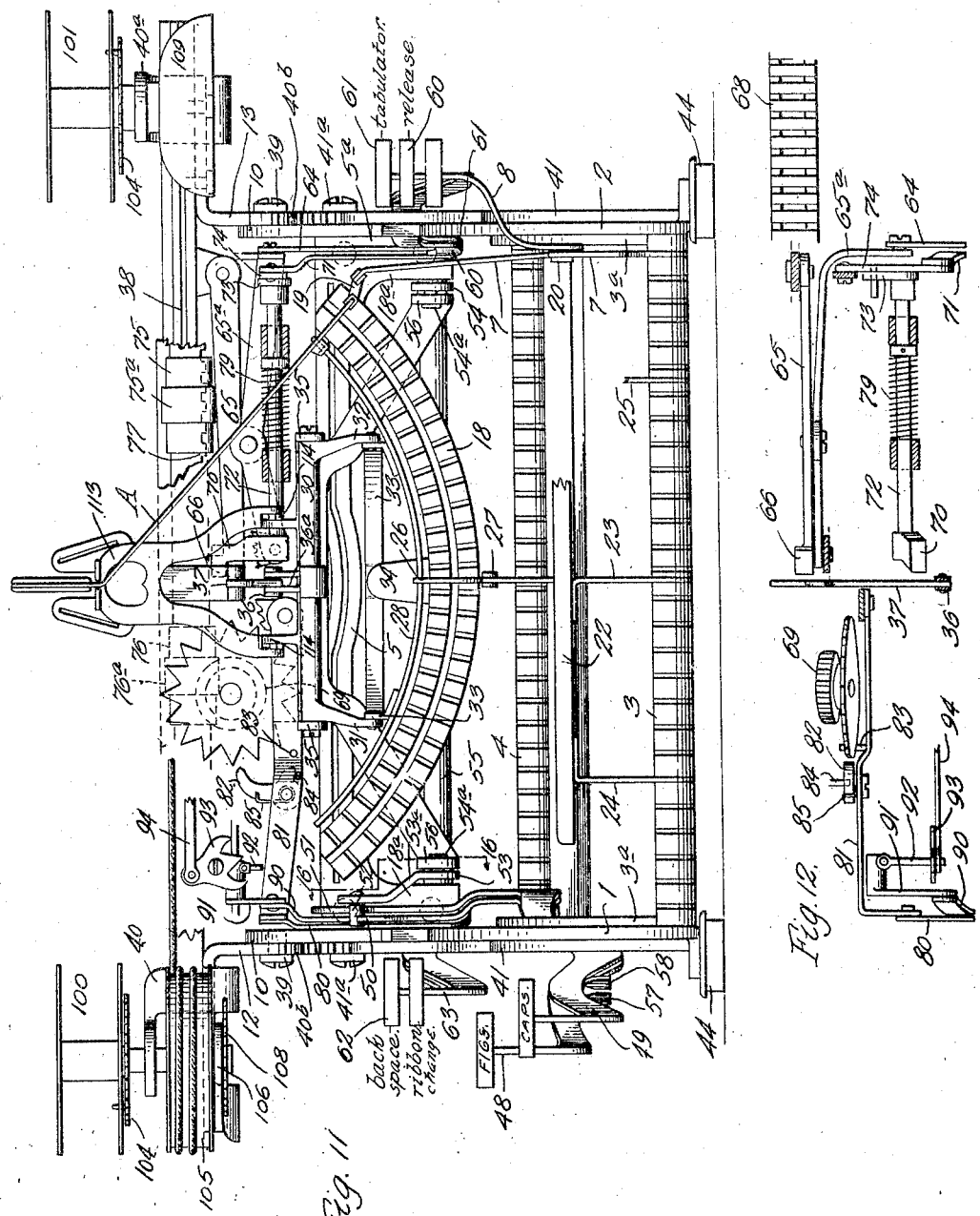

April 28, 1925.
E. G. LATTA
1,535,322
TYPEWRITING MACHINE
Filed July 7, 1921
6 Sheets-Sheet 6
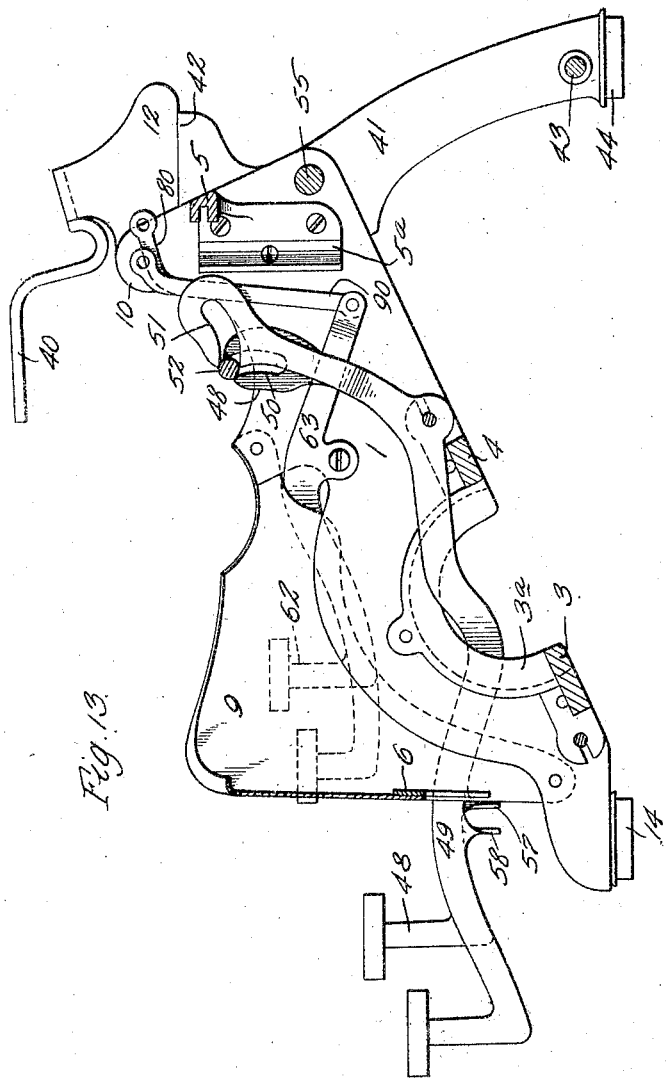
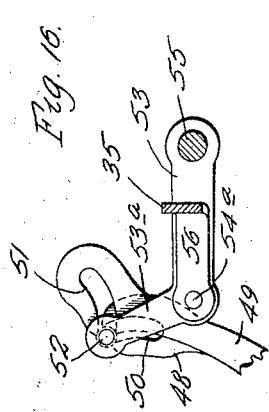
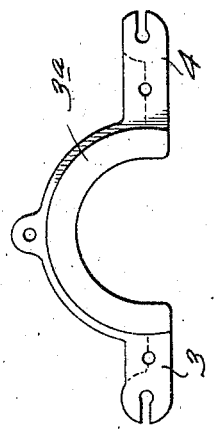
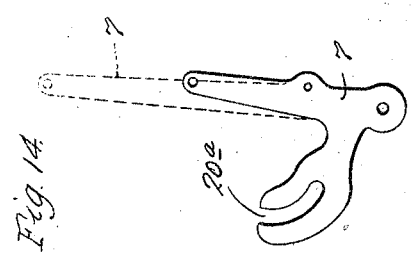
INVENTOR.
Emmit G. Latta.
by Parker & Rockmore
ATTORNEYS.

Patented Apr. 28, 1925.

1,535,322

UNITED STATES PATENT OFFICE.

EMMIT G. LATTA, OF SYRACUSE, NEW YORK.

TYPEWRITING MACHINE.

Application filed July 7, 1921. Serial No. 482,974.

*To all whom it may concern:*

Be it known that I, EMMIT G. LATTA, a citizen of the United States, residing at Syracuse, in the county of Onondaga and State of New York, have invented a new and useful Improvement in Typewriting Machines, of which the following is a specification.

This invention relates to typewriting machines and more particularly to improvements in portable typewriters of the kind that are adapted to be folded or reduced in dimensions for making them more convenient to carry or transport.

One object of the invention is to produce a thoroughly practical and desirable portable typewriting machine which is of very light weight and small dimensions but sturdy and durable. Other objects are to produce a portable typewriter in which the frame is constructed to fold so as to both shorten the machine and lower it or reduce its height; also to arrange various operating devices of the machine supported on the folding part of the frame and actuated by parts mounted on the main frame, so that they are positively connected at all times and require no special manipulation or attention when folding and unfolding the machine; also to provide a practical, simple pivot connection of the universal bar with the escapement and ribbon vibrator, which avoids the usual make and break connections heretofore used on folding typewriters; also to connect the two folding parts of the machine so that they will fold in unison and require but one motion to both shorten and lower the machine, or to restore it to operative position; also to equip the machine with a device which, when folding the machine, operates to lock the key levers, the type bars, and the type bar segment and its shift levers against movement; also to combine with the usual front-strike type bars, a key action especially adapted for a machine having the other novel structural features hereindescribed; and also to embody in a light folding machine of small dimensions, special devices not usual in such machines and which can be actuated from the keyboard; and to improve typewriting machines in the other respects hereinafter described and set forth in the claims.

In the accompanying drawings:—

Fig. 1 is a side elevation of a typewriting machine embodying the invention, showing the parts in their operative positions.

Fig. 2 is a section thereof on line 2—2, Fig. 1.

Fig. 3 is a longitudinal sectional elevation of the machine.

Fig. 4 is a fragmentary plan view of the carriage, with the platen removed and parts broken away to disclose the underlying parts.

Fig. 6 is an elevation of the machine folded or collapsed.

Fig. 7 is a longitudinal sectional elevation of the folded machine.

Fig. 8 is a transverse sectional elevation showing the ball bearing guide for the shiftable segment.

Figs. 9 and 10 are respectively side and edge elevations of the ball retainer and balls of said guide.

Fig. 11 is a fragmentary front elevation of the machine.

Fig. 12 is a sectional plan view of parts of the mechanisms for back spacing the carriage, releasing the line lock and margin stops, and reversing the feed of the ribbon.

Fig. 13 is a longitudinal sectional elevation showing one side of the frame and associated parts.

Fig. 14 is an elevation of one of the central or shortened sub-levers and showing by broken lines the different shape of one of the longer levers.

Fig. 15 is an end elevation of the cross-frame which connects the side plates of the main frame.

Fig. 16 is a fragmentary sectional elevation on line 16—16, Fig. 11 of the segment shifting mechanism.

Figure 5:
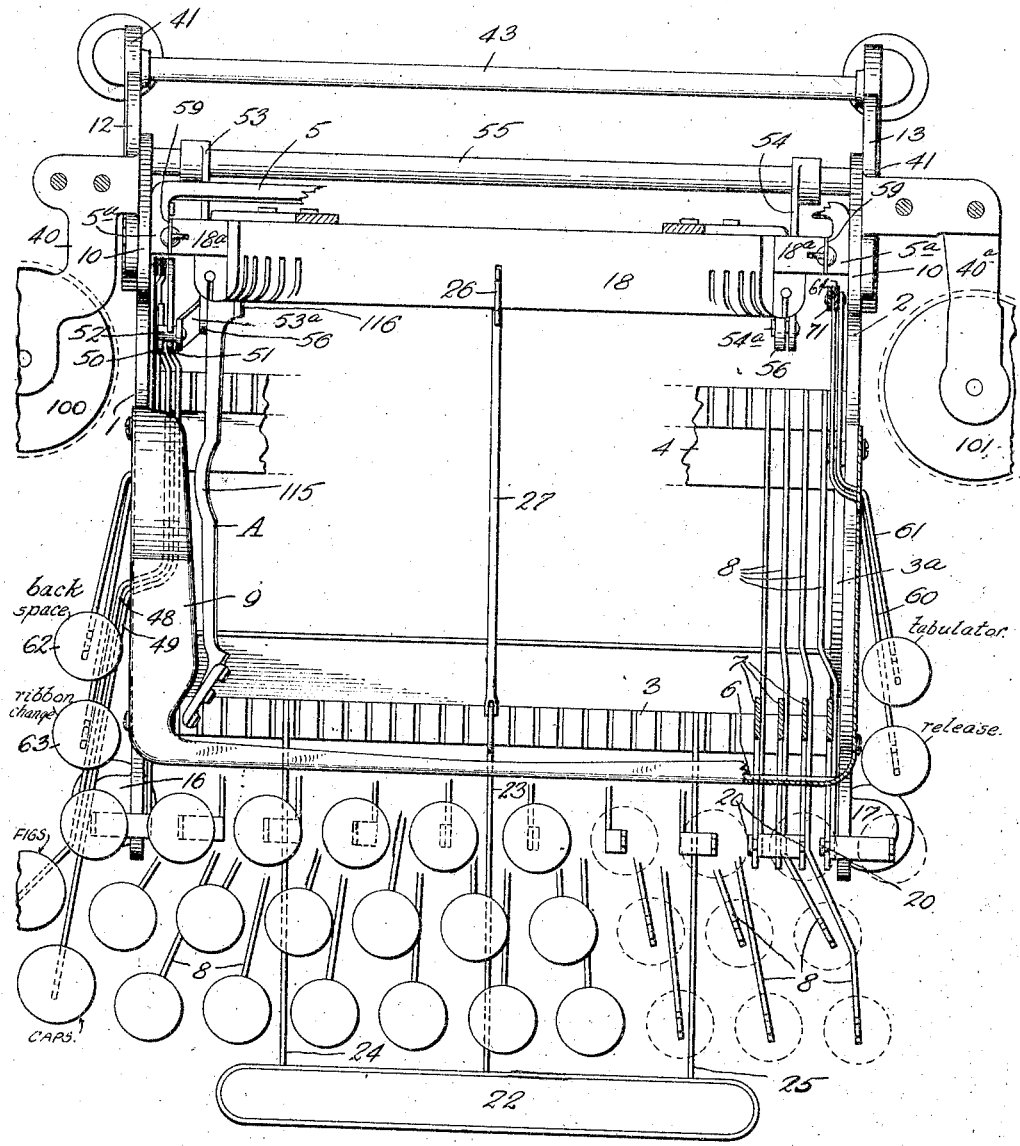
Fig. 5 is a fragmentary plan view of the machine with the carriage and some of the other parts omitted.

The main frame is built up of side plates 1 and 2, and transverse connecting bars 3—4—5 and 6, two of these bars 3 and 4 being slotted to receive the lower ends of sub-levers 7 and rear ends of key levers 8. The ends of bars 3 and 4 are united by arched bridges 3ª making a rectangular frame to stiffen the main frame. The arched bridges seat in recesses in the lower edges of the side plates and permit the shift levers to pass under them. The ends of bar 5 are enlarged and turned at right angles to form ball races 5ᵃ to guide the segment in its shifting movements, and the central part of this bar is folded to stiffen it but reduce its width and make room for parts above and below it that shift up and down. The bar 6 is slotted and forms a guide comb for the front ends of the key levers. A sheet metal hood 9 forms an additional connection between the side plates as its lower edge passes from one side plate to the other and is connected to them by screws as seen in Fig. 1. The upper ends of side plates terminate in semi-circular parts 10 to which the end plates 12, 13 of a carriage supporting frame are pivoted as seen in Figs. 5 and 11 and the front ends of side plates 1 and 2 are turned outwardly and provided with rubber feet 14, 15 to which they are secured by sheet metal cups 16, 17.

To lessen the weight of the machine, the frame is only made long enough to permit the type-bar segment 18 and its bearings to be located between the side plates, and for the same reason the segment is only long enough to receive the type-bars, and provide ball races 18ᵃ at its ends.

The type-bars shown at A are of the usual front-strike variety. The keys that actuate the type-bars are arranged in three banks ascending from front to rear as usual in this class of machines, and to get the sub-levers 7 and rear ends of the key levers 8 within the narrow frame the upper ends of the rear bank of key levers are offset outwardly as seen in Fig. 5, the offsets being opposite at opposite sides of the center of the machine and the outer or end levers being offset the most. The front ends of the two front banks of key levers are fanned outwardly to locate the finger keys in proper positions. In order to secure the required length in the upright parts of the sub-levers 7, which are positioned above the inclined plane of the bottom of the main frame, they are located farther forward than usual and this permits the use of extra long links 19 to actuate the type-bars. The sub-levers are bell cranks with their upright arms of graduated lengths, and they are connected to the key levers by studs 20 entering curved slots 20ᵃ in the forwardly projecting ends of the levers. These ends are all of the same length, but the curved slots are graduated to equalize the movement of the upper ends of the sub-levers. The studs 20 are preferably grooved where they rest in the slots of the sub-levers. This construction, by suitable variation of the slots 20ᵃ produces any desired degree of accelerating motion in the type-bars with an equal depression of the keys, and operates with an unusually light touch. Retracting springs 21 connect the sub-levers directly to lugs 22 on the key levers, and owing to the change in direction of the pull on the latter as the key descends, the springs exert considerably more force at the completion of the movement of the levers than they do at the start. This tends to return the type-bars, or start them on their return with speed, and without increasing the initial resistance to the depression of the keys. The upper ends of the central sub-levers extend close to the type-bars when the bars are at their lowest shifted position, and this requires the links 19 to be bent as shown in Figs. 3 and 7. This applies to the central links only as the front ends of the links diverge outwardly so that all but a few of those in the center may be straight.

The space bar 22 is supported by a bell crank 23 at its center, and two levers 24, 25 parallel with the front part of the bell crank, all three being rigidly connected to the space bar, and all pivotally mounted in bar 3. The upper end of lever 23 is connected to a lever 26, Fig. 3, by link 27, and the upper end of the lever 26 is arranged to engage and actuate the universal bar 28. All of the links 19 and 27 described are preferably of inverted U section, and have split ends to straddle the heels of type-bars and ends of levers. They are preferably riveted to the type-bars, and have snap connections with the levers. The upper end of bell crank 23 limits the downward movement of the space bar by contacting with a stop 29 on comb plate 6.

The universal bar 28 is of the usual curved form actuated by the direct impact of the type-bars, and is supported on the segment so as to shift with it, by a rock shaft 30 having legs 31, 32 pivoted to rearwardly extending arms 33 of the universal bar. These arms are brought to the center at their rear ends and united to a stem 33ᵃ which slidably bears in the rear part of a bracket 34 to hold the universal bar upright. The bracket 34 is rigidly secured to the central part of the segment and has a forward extension to which a spring 34ᵃ is secured. This spring is attached at its rear end to the parts 33 and returns the universal bar to intercept the next type-bar that prints.

Rock shaft 30 is journalled on a bracket 35 rigidly secured to the segment and has a rigidly connected upwardly extending arm 36ᵃ pivoted to the front end of link 36, the rear end of which is pivoted to the short arm of bell crank lever 37 that actuates the ribbon vibrator and trips the escapement. The pivots at the ends of the link 36 are on a plane at right angles to the plane of movement of the segment, and half way between the upper and lower positions of the front pivot when the segment is shifted, thereby causing the lever 37 to be moved substantially the same distance with the segment in either position.

This construction is important in a folding typewriter of the construction shown, since it enables the pivot at the front end of the link 36 to be located on the axial line of the two pivots by which the carriage supporting frame is connected to the main frame, or so near that line as not to interfere with the free folding of the carriage. Another important point is that the link 36 is connected to the universal bar by a simple pivotal joint that makes the ribbon and escapement mechanisms in a folding machine as sure and easy in action as the same parts in non-folding machines. The arm 36$^a$ is bifurcated and the link 36 is made double or composed of two spaced bars so that they may pass upwardly on opposite sides of the lever 37 when the segment is shifted to its highest position.

The folding support or frame for the carriage comprises the two end plates 12—13 and a connecting carriage track bar 38 to which the end plates are rigidly secured by rivets or screws. The front and rear edges of bar 38 are grooved to form ball races and support the carriage by ball bearings in the usual way. This bar may be of any desired length suitable for the carriage to be mounted thereon. The end plates are located to closely embrace the side plates 1 and 2 of the main frame on their outer sides and are pivoted thereto as by screws 39. The upper parts of the end plates extend outwardly at right angles and are secured to the under side of the bar 38, and said upper parts have integral forwardly and upwardly extending arms or brackets 40, 40$^a$ to support the ribbon mechanism, spring drum, and alarm bell. The end plates 12—13 also have integral segmental spur tooth gears 40$^b$ near their pivots, as seen in Figs. 1 and 11, meshing with similar gears on the upper ends of folding legs 41 that support the rear of the main frame when in operative position. These legs 41 are pivoted to the rear end of main frame side plates by screws or pivots 41$^a$, see Figs. 1 and 11, and they have rearward extensions 42 which bear against the bottom edges of the plates 12 and 13 when in operative position to support the folding frame and carriage and relieve the pivots from strain. The segmental gears on legs and plates are of different radius so that the folding of the legs will produce a greater angular movement of the carriage support. The legs are rigidly connected by a bar 43 and their lower ends turn outwardly and are provided with rubber feet 44 similar to those under the front of the main frame. 45, Fig. 2, represents a spring stop adapted to enter either of two holes 46, 47 in side plate 2 to hold the legs in either of their positions, and acting through the segmental gears, to also secure the carriage supporting frame against accidental movement.

To fold the machine the spring stop is drawn out and then either the legs or carriage supporting frame may be turned forward, the gear connections causing both to move simultaneously, and the same action is had when restoring the parts to operative position. The spring stop is not required for the successful use of the machine, but is preferred to prevent slamming of the parts in handling the machine. The gear segments also could be dispensed with as they are not essential to the operation of the machine, but they are desirable as causing both parts to move in unison, and one part to lock to the other. When folded, the rod 43 rests under the key levers at 43$^a$ and locks them and also the connected type-bars in their normal positions. It also locks the shift levers 48, 49 and through them the segment.

The shift levers 48, 49 are offset to pass under side plate 1 of the main frame and are pivotally mounted on bar 4 near its end. Their rear ends terminate in cams 50, 51 which act on a stud 52 to shift the segment either up or down from the central or lower case position shown. The stud 52 is rigidly mounted on a forward extension 53$^a$ of a lever 53 the rear end of which is rigidly secured to rock shaft 55. This rock shaft is supported by screws at its ends passing through the side plates of the main frame. Another lever 54 without the forward extension is secured to the other end of rock shaft, and these two levers support the segment by means of studs 54$^a$ projecting laterally from the levers into openings in arms 56 of the bracket 35 rigidly secured to the segment. The central part of rock shaft 55 is bent downwardly slightly to clear bracket 34 when the segment is lowered. 57—58, Figs. 11 and 13, represent downwardly extending lugs on the shift levers. By deflecting either shift lever when at its lowest position, its upper edge will engage the lug on the adjacent lever and be held down by it, or the shift will be locked until released by moving the locked lever in the opposite direction.

59, Figs. 8—10 shows a novel form of ball retainer which secures the balls of the segment shift guide in their races in the main frame when the segment is detached as indicated in Fig. 8. This retainer consists of a piece of sheet metal stamped into shape to form cages for the two balls 59$^a$ of the guide, and the retainer is secured in the ball race by a screw 59$^b$. By disconnecting the universal bar from the link 36 and removing four screws from each side of the machine the segment may be lowered clear from the main frame, the entire printing mechanism and cross bars 3, 4 coming with it as a unit. The carriage, the carriage supporting frame and supporting legs may each be detached as units.

Special key levers 60, 61 on the right and 62, 63 on the left for the purposes hereinafter described, are offset to pass over the side plates 1 and 2 to which they are pivoted on the inside. Their rear ends are covered by the hood 9 and are pivoted to the lower ends of links by which they are connected to operative parts mounted on the carriage supporting frame. The finger keys which actuate these parts are located at the rear of the type-actuating keys, and the connections permit the carriage to be folded without attention to them, thus overcoming a serious objection to folding machines. The finger keys of these four special key levers, 60—63, are located in rear of the upper bank of printing keys, two at each side of the main frame. In Fig. 5 these keys are designated respectively "Release", "Tabulator", "Back Space" and "Ribbon Change" and are for the purposes thus indicated.

The tabulator key acting through the lever 61 and a link 64 raises a stop lever 65, Figs. 11 and 12, first to place a stop 66 at the inner end of the lever in the path of stops 67 on a rack bar 68 on the carriage, and then raise the rack bar out of engagement with the feed pinion 69 and permit the carriage to move until the next stop 67 on the rack bar contacts with the stop 66. The stop lever 65 and a lever 65ª are pivotally connected between their ends, and one end of each of these levers is pivoted to a bracket on the track bar 38 so that the upward movement of the outer end of the lever 65ª which is connected to the link 64, raises the inner end of the stop lever 65 and stop 66. The rack bar 68 has the usual feed rack or teeth along its lower front edge and is movably mounted on the carriage as usual by the rear end of a carriage release lever 68ª and an arm pivoted to the opposite ends of the carriage. When the key 61 is released the rack bar 68 follows it downwardly and continues in engagement with the stop 66 until the rack on the lower edge of the rack bar re-engages the feed pinion.

The release lever 60 actuates a line locking and margin release stop 70 by means of a link 71 and the following connecting parts, see Figs. 11 and 12: The stop 70 is rigidly mounted on a rock shaft 72 having a crank arm 73 on its opposite end. A pin and slot connects the crank to a lever 74, the rear end of which is pivoted to a bracket rigid with track bar 38. The front end of the lever 74 is pivoted to the upper end of the link 71. The shaft 72 is free to both slide and rock in its bearings. 75 and 76 represent margin stops adjustably mounted on the carriage. Preferably the lower front edge of the track bar 77, which rigidly connects the end plates 78 and 78ª of the carriage, forms a rack on which the margin stops are adjustably mounted and releasably locked in place by spring latches 75ª and 76ª. When the stop 75 strikes the stop 70 it and the rock shaft are forced to the left one letter space and lock the vibrator lever 37 against its next upward movement, or lock the line, as it is called. To release the lock, the lever 60 is depressed and acting through the connections described swings stop 70 forwardly until it clears stop 75, when a spring 79 coiled around the rock shaft 72 forces the shaft and stop back to the right and frees the vibrator lever. The stop 70 then rides along the front side of stop 75 while a few more characters are printed. When the carriage is set back for a new line the stop 70, actuated by the spring (not shown) that restores lever 60, swings back in line with the stop 75. The left hand margin stop 76 may be set past the stop 70 by depressing the lever 60 when setting the carriage back.

The back space lever 62 acts through a link 80 to raise a lever 81 and cause a pawl 82 to engage the escapement wheel and turn it backwardly a little more than one tooth space when a pin 83 rigidly secured on the lever 81 blocks further movement of the wheel. A stationary pin 84 intercepts the heel of the pawl 82 and holds it from contact with the wheel when the parts are in normal position, and a suitable spring 85 acts to engage the pawl with the wheel when the pawl is clear from the pin 84.

The ribbon change lever 63 acting through a link 90 on a lever 91 swings this lever on its horizontal axis. 92 represents an arm pivoted on the lever so that its front end is adapted to swing laterally in either direction from the normal central position shown, and a spring (not shown) acts to restore it to the central position. 93 represents a plate pivotally mounted on a fixed support secured to the under side of the track bar 38, and 94 is a link pivoted to the upper part of the plate and to the ribbon feed mechanism (not shown). When the lever 62 is depressed the arm 92 swings up under plate 93 and striking an inclined edge thereon, is deflected to one side thereby. The continued upward movement of the arm acts to turn the plate on its pivot, and this moves the link 94 to change the action of the ribbon feed mechanism. This leaves the plate in position for the next movement of the arm 92 to act on an oppositely inclined edge of the plate 93 and reverses the feed of the ribbon. For a more expensive and complete machine, the link 94 is utilized to change the vibrating mechanism to use a ribbon having two fields, and the ribbon feed reverses automatically. The parts shown are alike in both constructions, and the complete mechanism will be shown and described in another application.

It should be noted that levers 60, 61 and 62, 63 at opposite sides of the frame are alike except that they are offset in opposite directions, also that the links 71 and 90 are pivoted to the parts 74 and 91 on the exact axial line on which the machine frame folds, while links 64 and 80 connects to parts 65ª and 81 in rear of that line so as to apply the power for raising those parts nearer in line with the work they do. In folding the carriage supporting frame, the pivots connecting links 64 and 80 to the levers 65ª and 81 swing over the axial line and concentrically therewith, at the same time drawing the links and rear ends of the levers 61 and 62 upwardly, but do not move them as far as when the keys are depressed in operating the machine. At such time, the link 80 swings forwardly between the outer shift cam and side plate.

The ribbon spools 100 and 101 are loosely mounted on shafts supported by the brackets 40 and 40ª projecting forwardly from the carriage supporting track bar. 104 is a ratchet wheel under the spools driven by the carriage driving motor, and has the usual pin projecting into the lower side of the spool to cause it to turn with the wheel. The spools are arranged to deliver the ribbon without twisting just below the printing point, and they are placed so as to pass downwardly beside the main frame and outside thereof when the machine is folded.

The carriage driving spring motor 105 is mounted under bracket 40 and is partly supported by bracket 106 at its under side. The spring drum is connected to the carriage end plate 78ª by a small cord 107 coiled around the drum and having an enlarged end held in a slot in the outwardly turned lug at lower front part of the end plate as seen in Figs. 1 and 6. The tension of the driving spring is regulated by the ratchet wheel 108 under the motor, in the usual way.

The alarm or signal bell 109 is rigidly secured to bracket 40ª which supports the spool 101 and directly under the same.

110 represents the line space lever which is of the usual horizontally swinging type at the left end of the carriage, and actuates the line space pawl at the same time the carriage is set back for a new line. This lever and the carriage release lever also, swing downwardly when the carriage is folded to the positions indicated in Fig. 6, below the line $a$—$b$, which represents the plane of the top of the folded machine.

111 represents the paper table which is mounted so that it can turn slightly on a supporting rod 112 and is held in normal position by a spring and stop (not shown). When the machine is folded and the cover of the enclosing or carrying case is closed, the paper table is thereby forced below the line $a$—$b$ as indicated in Fig. 6. As will be seen from Fig. 6, when the machine is folded all of its parts will be located within a space bounded by planes represented by the lines $a$—$b$—$c$—$d$ in said figure, which lines therefore show the folded size of the machine. The location of the parts of the machine with reference to these lines when the machine is in the operative position, is shown in Fig. 1.

The center guide 113 can be constructed and arranged as usual except that it is hinged at its lower end to lugs 114 on the bracket 35 which is fixed on the segment, see Figs. 3 and 11. The center guide is held in upright operative position by springs and stops at its hinged end, and it shifts with the segment. When the carriage is folded the guide is forced to turn down forwardly out of the way. The hinges at the lower end of the guide are located on the axial line of the folding hinges for the frame, so that the guide folds and resumes its normal position without appreciable friction and requires no attention.

As shown in the drawings, the two outermost type-bars are made with curved offsets 115 in order to permit the platen to swing down to the folded position shown in Fig. 7, and these two type-bars are also preferably provided with lugs 116 which are offset from the inner edges of the bars so as to act on the universal bar nearer to its center and nearer in line with the pivots by which the bar is supported.

While the present improvements are shown and described in a machine having a shifting segment, it should be manifest that in so far as many of the features of the invention herein claimed are concerned, they are also applicable to machines having a shifting platen.

I claim as my invention:

1. In a typewriting machine, the combination of a main frame, a universal bar supported by the main frame, a folding frame mounted on said main frame, a platen and a ribbon vibrator supported on the folding frame and a link connecting the universal bar to the vibrator and having a pivoted connection at each end, and means for shifting one end of the link either up or down from its normal central position.

2. In a typewriting machine, the combination of a main frame, a universal bar mounted on the main frame, a folding frame mounted on said main frame, a platen and a carriage escapement mounted on said folding frame, a link having pivotal connections at its opposite ends with the universal bar and escapement, and means for shifting either the universal bar or escapement mechanism and the connected end of link up or down from normal position.

3. In a typewriting machine, the combination of a main frame, a type-bar segment shiftable on the main frame, a universal bar shiftable with the segment, a folding frame mounted on said main frame, a platen and a ribbon vibrator mounted on and folding with the folding frame, and a link having pivotal connections with the universal bar and vibrator, the pivots being arranged normally on a plane substantially at right angles to the plane in which the segment moves when shifted.

4. In a typewriting machine, the combination of a main frame, a series of front-strike type-bars mounted thereon, a folding platen support pivoted to the rear end of the main frame and adapted to fold forwardly and downwardly to locate the platen between the front and rear ends of the type-bars.

5. In a typewriting machine, the combination of a main frame, a platen support pivoted to the rear end of the main frame and adapted to fold forwardly and downwardly, and a series of front-strike type-bars supported by the main frame, the outer bars of the series having offset portions between their ends to receive the platen when the platen support is folded.

6. In a typewriting machine, the combination of a main frame, a series of segmentally arranged type-bars and a universal bar actuated by the impact of the type-bars mounted on the main frame, a folding frame, a platen and a ribbon vibrator mounted thereon, and connections between the universal bar and vibrator that retain their unbroken relation when the folding frame is folded.

7. In a typewriting machine, the combination of a main frame, segmentally arranged type-bars shiftable for different case printing and a segmental universal bar shiftable with the type-bars mounted on the main frame, a folding frame, a platen and a ribbon vibrator mounted thereon, and connections between the universal bar and vibrator that remain connected when the segment is shifted and when the frame is folded.

8. In a typewriting machine, the combination of a main frame, segmentally arranged type-bars and a segmental universal bar actuated by the impacts of the type-bars mounted on the main frame, a folding frame, a platen and an escapement mechanism mounted on said folding frame to fold therewith, and connections between the universal bar and escapement mechanism that remain connected at all times.

9. In a typewriting machine, the combination of a main frame, a series of type-bars mounted thereon, a folding frame pivotally mounted on the rear part of the main frame, a universal bar mounted on the main frame, a platen and a ribbon vibrator mounted on the folding frame, and a pivotal connection between the universal bar and vibrator located substantially on the pivotal axis of the folding frame.

10. In a typewriting machine, the combination of a main frame, a series of type-bars mounted thereon, a folding frame pivotally mounted on the rear part of the main frame, a universal bar mounted on the main frame, a platen and a device operable at the type strokes mounted on the folding frame, and a pivotal connection between the universal bar and said device located substantially on the pivotal axis of the folding frame.

11. In a typewriting machine, the combination of a main frame, a series of type-bars mounted thereon, a folding frame pivotally mounted on the rear part of the main frame, a universal bar mounted on the main frame, a platen and a device operable at the type strokes mounted on the folding frame, a link connected to said device and extending forwardly therefrom, and a pivoted connection between said link and the universal bar located substantially on the pivotal axis of the folding frame.

12. In a typewriting machine, the combination of a main frame, a series of type-bars, a supporting segment therefor shiftably mounted on the main frame, a folding frame pivotally mounted on the rear part of the main frame, a universal bar arranged to be engaged and actuated by the type bars, a platen and a device operable at the type strokes mounted on the folding frame, a link connected to said device and extending forwardly therefrom, and connections between said link and the universal bar including a pivot located substantially on the pivotal axis of the folding frame.

13. In a typewriting machine, the combination of a main frame, a series of type-bars and a universal bar mounted on the main frame, a folding frame pivotally mounted on the rear part of the main frame, a platen and an escapement mechanism mounted on and folding with the folding frame, and a pivotal connection between the universal bar and escapement located substantially on the pivotal axis of the folding frame.

14. In a typewriting machine, the combination of a main frame, type-bars supported by the main frame, a folding platen support mounted on said main frame, tabulating mechanism adapted to fold with the platen support, an actuation key therefor mounted on the main frame, and a pivotal connection between the tabulating mechanism and the actuating key located substantially on the pivotal axis of the folding platen support.

15. In a typewriting machine, the combination of a main frame, type-bars mounted on the main frame, a folding platen support mounted on the main frame, a carriage back spacing mechanism mounted on the folding platen support, and an actuating key for said mechanism mounted on the main frame and having a pivotal connection with the back spacing mechanism located substantially on the pivotal axis of the folding platen support.

16. In a typewriting machine, the combination of a main frame, type-bars mounted on the main frame, a folding platen support on the main frame, mechanism for changing the action of the ribbon mechanism mounted on the platen support, and an actuating key for said changing mechanism mounted on the main frame and having a pivotal connection with said changing mechanism located substantially on the pivotal axis of the folding platen support.

17. In a typewriting machine, the combination of a main frame, type-bars mounted on the main frame, a folding platen support mounted on the main frame, mechanism for locking the line mounted on the folding platen support, an actuating key for said line locking mechanism mounted on the main frame, and a pivotal connection between the line locking mechanism and said key located substantially on the pivotal axis of the folding platen support.

18. In a typewriting machine, the combination of a main frame, type-bars and a folding platen support mounted on the main frame, marginal stops and mechanism for releasing the margin stops on the folding platen support, a key mounted on the main frame, and a pivotal connection between the key and marginal stop mechanism located substantially on the pivotal axis of the folding platen support.

19. In a typewriting machine, the combination of a main frame, type-bars and a folding platen support mounted thereon, margin stops and mechanism for releasing the margin stops and for locking the line mounted on the folding platen support, a key mounted on the main frame, and connections between the key and line locking and margin stop release mechanisms whereby the same key actuates both mechanisms.

20. In a typewriting machine, the combination of a main frame, a series of key levers supported by the main frame, a folding support for the main frame, and a part actuated by folding the support to lock the key levers.

21. In a typewriting machine, the combination of a main frame, a shift lever mounted on the main frame, a folding support for the rear of the main frame, and a part actuated by folding the support to lock the shift lever.

22. In a typewriting machine, the combination of a main frame, a folding platen support on its rear part, ribbon spools mounted on the platen support and arranged to extend down outside of the main frame when the platen support is folded.

23. In a typewriting machine, the combination of a main frame, a folding platen support on its rear part, a horizontally disposed line space lever on the platen support and arranged to extend downwardly outside of the main frame when the platen support is folded.

24. In a typewriting machine, the combination of a main frame, a folding platen support on its rear part, ribbon spools supported by the platen support at the front thereof, and a carriage driving motor mounted under one of the spools and supported by the spool support.

25. In a typewriting machine, the combination of a main frame, a folding platen support mounted on its rear part, ribbon spools supported by the platen support in front thereof, and a bell arranged under one of the spools and supported by the spool support.

26. In a typewriting machine, the combination of a main frame, a folding platen support mounted on its rear part, and ribbon spools mounted on the platen support in front of and above the pivotal axis of the folding platen support and outside of the main frame.

27. In a typewriting machine, the combination of a main frame, a folding platen support mounted on its rear part, and a carriage driving motor mounted on the platen support in front thereof and arranged to extend downwardly outside of the main frame when the platen support is folded.

28. In a typewriting machine, the combination of a main frame, a folding platen support mounted on its rear part, a shiftable type-bar segment, and a center guide pivotally mounted on the segment, the pivot being substantially on the axial line of the pivots connecting the platen support to the main frame.

29. In a typewriting machine, the combination of a main supporting frame, a platen at the upper rear part thereof, a frame support for the rear end of the frame, and a platen support on the rear part of the frame, said supports being movable forwardly and towards each other to reduce both the height and the length of the machine.

30. In a typewriting machine, the combination of a main supporting frame, a platen at the upper rear part thereof, a frame support and a platen support both pivoted on the rear part of the frame, said supports being foldable forwardly towards each other to reduce both the height and the length of the machine.

31. In a typewriting machine, the combination of a main supporting frame, a platen at the upper rear part thereof, a frame support for the rear end of the frame, a platen support on the rear part of the frame, said supports being movable forwardly and towards each other to reduce both the height and the length of the machine, and connections whereby one of said supports is moved by the movement of the other support.

32. In a typewriting machine, the combination of a main supporting frame, a platen at the upper rear part thereof, a frame support and a platen support both pivoted on the rear part of the frame, said supports being foldable forwardly towards each other to reduce both the height and the length of the machine, and connections whereby one of said supports is moved by the movement of the other support.

33. In a typewriting machine, the combination of a main supporting frame, a platen at the upper rear part thereof, a frame support for the rear end of the frame, a platen support on the rear part of the frame, said supports being movable forwardly and towards each other to reduce both the height and the length of the machine, connections whereby one of said supports is moved by the movement of the other support, and a locking device for one of said supports.

34. In a typewriting machine, the combination of a main supporting frame, a platen at the upper rear part thereof, a frame support and a platen support both pivoted on the rear part of the frame and extending respectively downwardly and rearwardly and upwardly and rearwardly from the frame, said supports being foldable forwardly towards each other to reduce both the height and the length of the machine.

EMMIT G. LATTA.

Witnesses:
LURA B. LATTA,
T. J. WALDORF.